Nov. 1, 1966     M. IMMERMANN ET AL     3,282,467
BEVERAGE APPARATUS
Original Filed Jan. 26, 1961     5 Sheets-Sheet 4
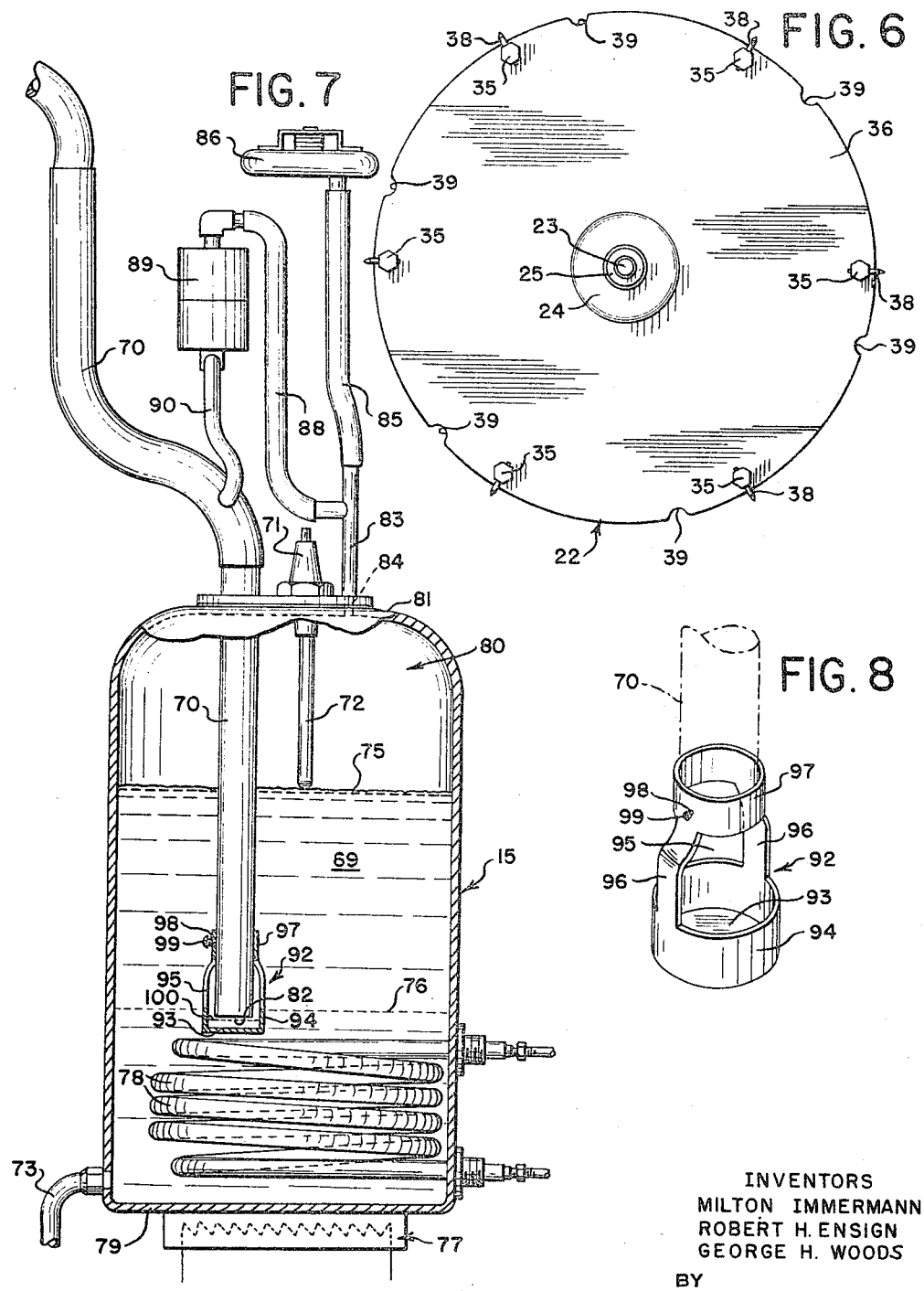
INVENTORS
MILTON IMMERMANN
ROBERT H. ENSIGN
GEORGE H. WOODS
BY
ATTORNEYS

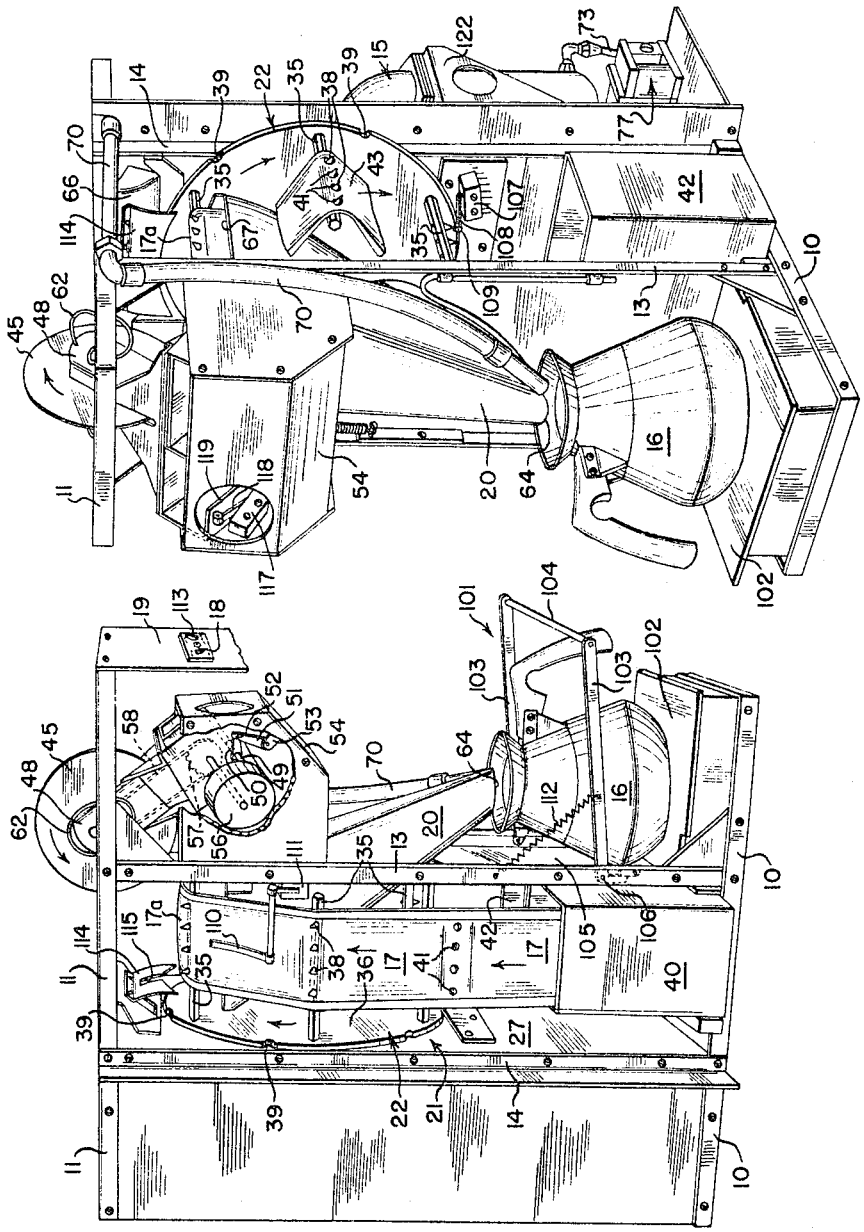

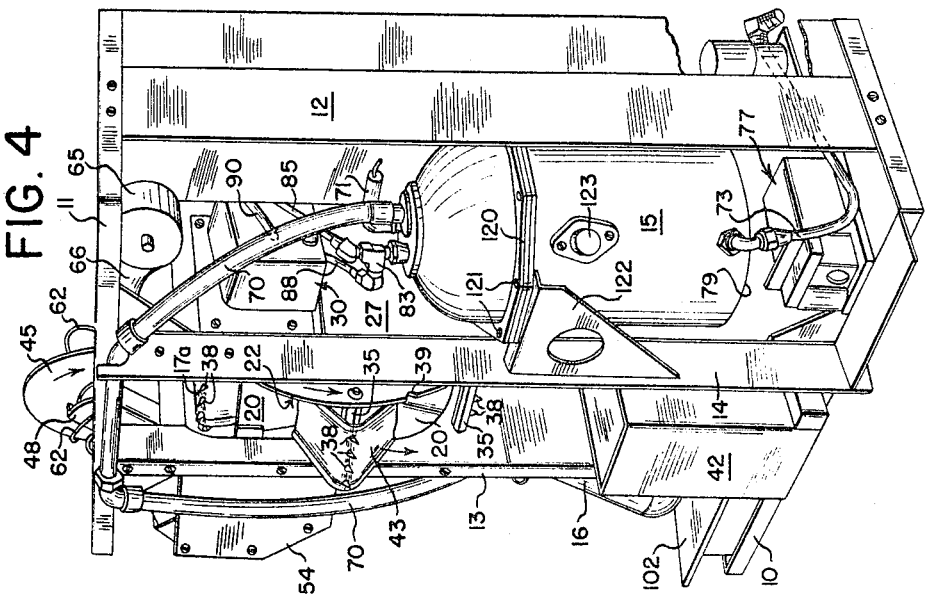
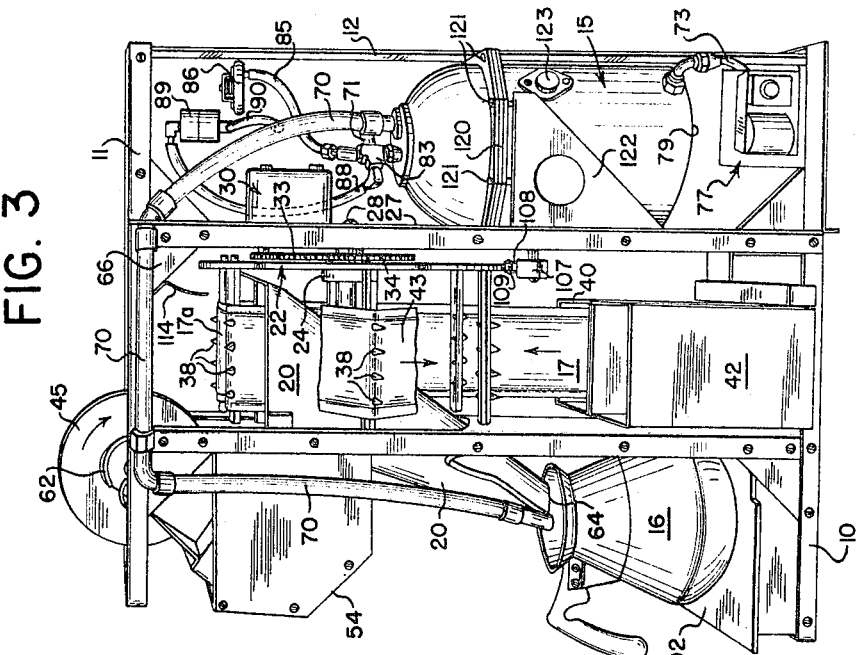

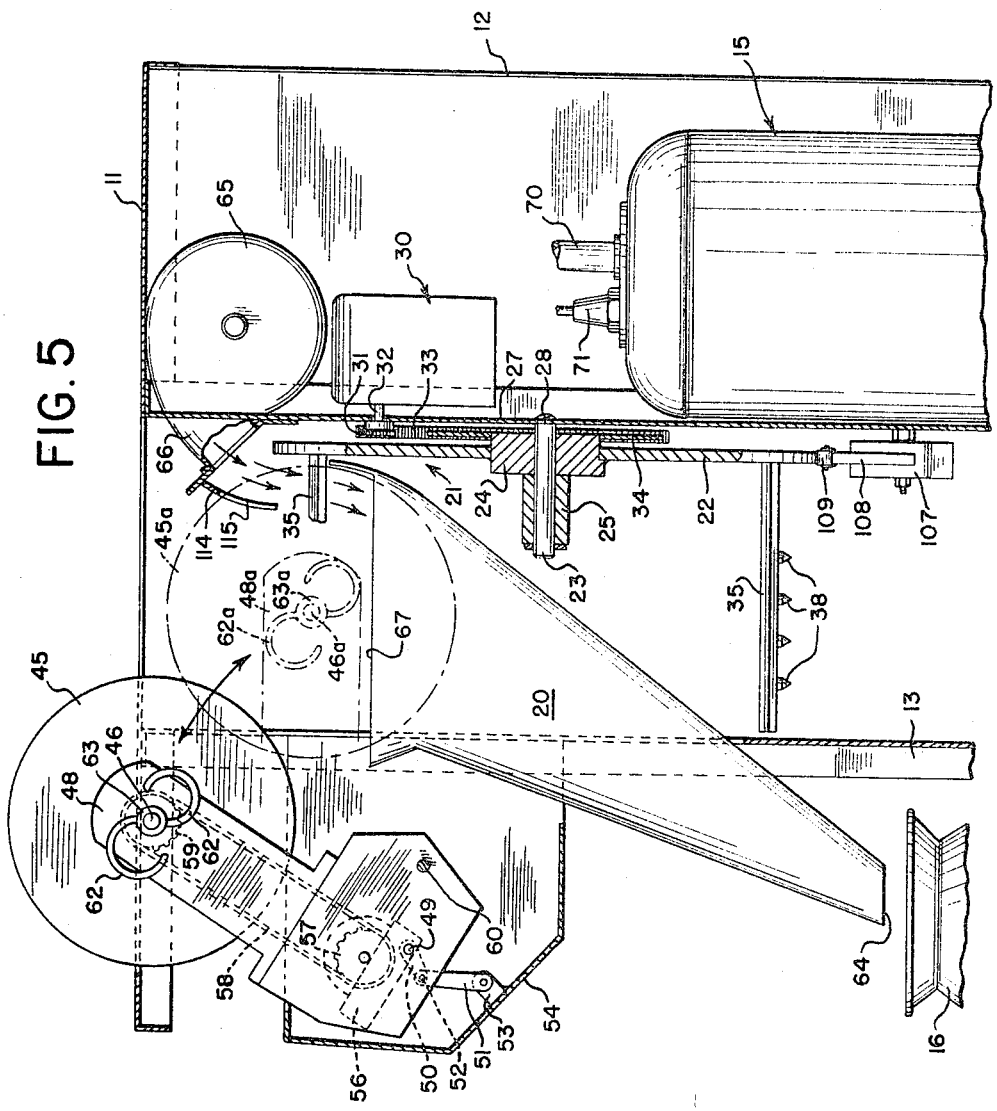

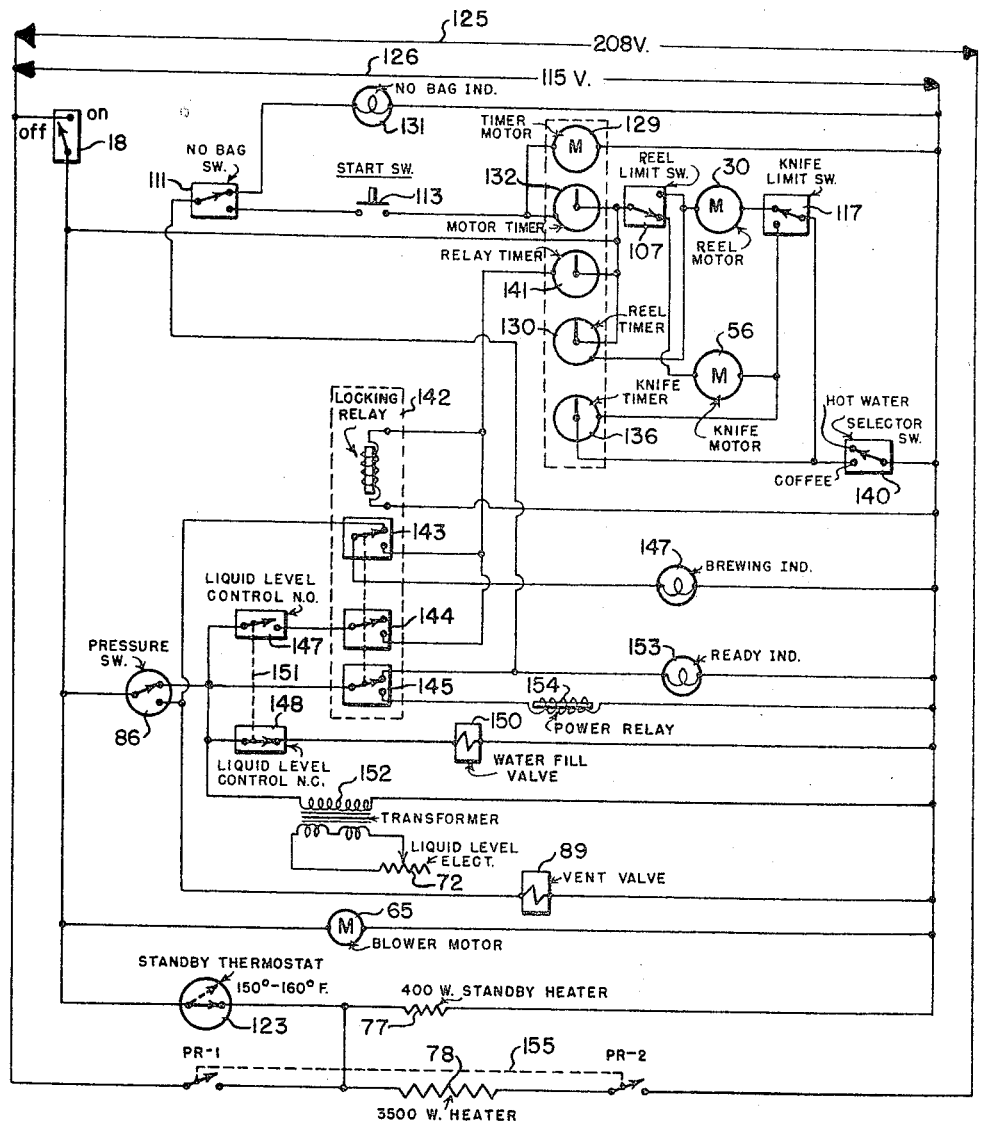

United States Patent Office 3,282,467
Patented Nov. 1, 1966

3,282,467
BEVERAGE APPARATUS
Milton Immermann, Piermont, Robert H. Ensign, Bronxville, and George H. Woods, New York, N.Y., assignors, by mesne assignments, to General Foods Corporation, White Plains, N.Y., a corporation of Delaware
Original application Jan. 26, 1961, Ser. No. 85,080, now Patent No. 3,181,732, dated May 4, 1965. Divided and this application May 3, 1965, Ser. No. 482,644
5 Claims. (Cl. 222—54)

This application is a division of a pending application of the same inventorship entitled "Beverage Apparatus", Serial No. 85,080, filed January 26, 1961, now Patent No. 3,181,732, granted May 4, 1965.

This invention relates to an apparatus for producing a predetermined quantity of a beverage. More particularly, the invention concerns an apparatus which, upon actuation, automatically functions to produce a predetermined quantity of a beverage by combining liquid and solid beverage ingredients to form the beverage solution.

Hot beverage solutions, such as coffee, tea, and the like, are in wide use in commercial establishments, where the need to prepare relatively large quantities of such beverages fluctuates widely within the period of one day. Thus, during breakfast hours, the need for the production of relatively large quantities of hot coffee is great, while at other hours between mealtimes the demand for coffee subsides. Due to such irregular requirements for coffee and the like, and because apparatus now in use in commercial establishments for the production of coffee require relatively long periods of time until the coffee has been brewed, restaurants and like establishments are either required to maintain coffee producing units of a capacity far in excess of their average requirements or have insufficient units on hand to meet periods of peak demand.

Even with the excessive periods of time now required in the brewing of coffee by commercial establishments, the coffee which they produce by means of percolator, silex, or other coffee brewing apparatus which utilize roasted and ground coffee does not meet high taste standards. It is generally agreed that in order for coffee of excellent taste to be produced, certain requirements must be met. For example, the water which is used to form the coffee must be preboiled. Such preboiling drives out gases which are dissolved in water normally obtained from reservoirs, springs, and similar sources. These gases give a "carmel" taste to the coffee beverages. In addition, the hot water and the coffee mix should be agitated in order to secure a complete transfer of flavor and aroma from the mix to the water. Finally, a "hold" or "meld" time in the order of three minutes should be allowed to elapse after the coffee has been produced in order to bring the coffee to its apex of flavor.

Methods and apparatus currently employed in commercial coffee-making equipment do not meet the needs of establishments for speed of production of coffee nor for the production of coffee in which the requisites of water preboiling, water and mix agitation, and meld time are met. It is, therefore, a primary object of the present invention to provide an apparatus for producing a beverage such as coffee and the like in commercial quantities in a period of time less than that now attainable through the use of present commercial equipment.

It is another object of this invention to provide an apparatus for producing coffee and the like in which the water to be mixed with the coffee is preboiled, the water and the coffee mix agitated, and a meld time easily permitted due to the speed of coffee production.

It is another object of this invention to provide an apparatus for producing coffee and the like in which operation of the apparatus is completely automatic so that beverage material need not be introduced by a human agency at the start of each cycle with the consequent possibility that foreign matter will be incorporated in the final beverage solution.

It is still another object of this invention to provide an apparatus for producing coffee and the like which need be supplied with solid beverage material only at relatively long intervals, yet in which the material so supplied will be kept fresh until immediately prior to use.

It is a further object of this invention to provide an apparatus for producing coffee and the like, the use of which does not require removal of used coffee grounds or like matter which is disagreeable to the senses.

The beverage apparatus according to the present invention comprises means for bringing together a liquid and a beverage mix which is soluble in that liquid. Thus, where the apparatus of the invention is utilized as a coffee maker, the liquid will be water and the coffee will be a soluble or "instant" coffee. The apparatus includes means for retaining a quantity of liquid and means for directing that liquid from the retainer into a receiving chamber. Also included is a package which contains a measured amount of soluble material and means for positioning the package so that when the material is released from the package, it can pass into the chamber. Means as part of the apparatus opens the package at its release position, thereby freeing the soluble material within the package and permitting it to pass into the chamber toward which the liquid is also directed. Where soluble coffee, tea, and like substances are retatined within the package, the apparatus also includes means for heating the liquid to its boiling point.

As incorporated in a preferred embodiment of the invention, the means for positioning the package containing the soluble material is a rotatable reel, which carries means for retaining a package on its periphery. With the package held on the reel periphery, rotation of the reel acts to move the package to its release position. Advantageously, that release position is one in which a package held on the reel is disposed to overlie an entrance to the receiving chamber so that, when the package is opened in such position, the soluble material therewithin can fall by gravity into the chamber. A rotatable knife blade can be employed to open the package by cutting it and freeing the material therewithin. Additionally, a flailing member rotatable with the knife blade may be provided to beat the newly opened package and ensure release of all the contents thereof.

As stated, the apparatus also includes means for heating the liquid to be directed to the receiving chamber if the soluble material is coffee, tea, or the like. Means are provided for rotating the reel and for moving the knife blade in such a direction that it will cut and open a package at release position. It has been found desirable that the heating means and the reel rotating means be actuated simultaneously at the beginning of one cycle of operation. The means for moving a knife blade is only actuated after deactuation of the reel rotating means.

The combination of the rotatable reel and a package containing a measured amount of soluble material constitutes an important feature of this invention. According to a preferred embodiment of the invention the reel is formed in part with a plurality of bars extending transversely across the reel and spaced from each other along the periphery of the reel. Means for holding a package on the reel are located on these bars, so that each package is retained on the reel and against one or more of the bars. Means as part of each package cooperates with the means on the bars to effect package retention.

When one of the dimensions of the package is substantially equal to the linear distance between adjacent bars, the package will be supported by those adjacent bars and will extend between them. After the reel has been rotated to bring the package to release position, the cutting means moves across release position and between the adjacent bars to cut the package and release the soluble material therewithin.

The apparatus for heating a liquid to its boiling point and conveying the liquid to a receiving chamber constitutes another important feature of the present invention. That apparatus comprises a vessel for heating the liquid, means for supplying liquid to the vessel, and means for preventing the liquid in the vessel from rising above a predetermined level. A conduit extends from a location outside the vessel to a position within the vessel in which an end of the conduit is below that predetermined level. Means for heating the liquid are also provided within the vessel. When the liquid in the vessel is heated to its boiling point, the vapor pressure in the vessel forces liquid into the open end of the conduit, through the conduit and from the vessel.

To prevent premature discharge of small amounts of liquid from the vessel, a vent is formed in the vessel well above the liquid level. Means such as a diaphragm-actuated switch responsive to the vapor pressure in the vessel closes the vent just as the boiling point of the liquid is reached. The sudden restriction quickly increases the vapor pressure in the vessel to bring the liquid to its boiling point with a rapidity which eliminates dribbling of small amounts of liquid. Such dribbling has been found to be present when the liquid more slowly approaches its boiling point. After a quantity of liquid has been discharged from the vessel such that the liquid level therewithin falls below the level of the conduit end, the pressure within the vessel decreases and means responsive to that decrease in vapor pressure actuates the liquid supplying means to refill the vessel to the predetermined level. Also, the vent which was closed just prior to attainment of the liquid boiling point is opened.

Still another feature which has been incorporated in the apparatus of the present invention is a device which is attached to the end of the conduit within the heating vessel. This device is in the form of a cup having at least one aperture in its side wall and a continuous bottom. The cup is fixed to the conduit end so that the end projects within the cup at least to the lowest level of the aperture. When the liquid level in the vessel is at the level of the conduit end, the cup breaks a broad meniscus which would otherwise form between the liquid and the conduit end. Such a meniscus would render variable the quantity of liquid which flows from the vessel in accordance with the height of the meniscus.

These and other objects, features, and advantages of the present invention will become more apparent when considered in connection with the illustration of a preferred embodiment of the invention in the accompanying drawings, which form a part hereof, and in which:

FIG. 1 is a perspective view of the assembled apparatus of the invention as viewed from one side of the apparatus;

FIG. 2 is a perspective view of the assembled apparatus with parts thereof removed as viewed generally from the front of the apparatus;

FIG. 3 is a perspective view of the assembled apparatus of FIG. 2 as viewed from that side of the apparatus opposite the side illustrated in FIG. 1;

FIG. 4 is a perspective view of the assembled apparatus with parts thereof removed as viewed generally from the rear of the apparatus;

FIG. 5 is an enlarged elevational view, partly cut away, of the assembled apparatus from the side shown in FIG. 3;

FIG. 6 is an enlarged elevational view of part of the reel of the apparatus.

FIG. 7 is an enlarged elevational view, partly in section, of the heating vessel of the apparatus, and FIG. 8 is an enlarged perspective view of the meniscus-breaking device illustrated in section in FIG. 7.

Referring now to the drawings, and in particular to FIGS. 1 to 4 thereof, the apparatus of the invention is supported by a frame having a base 10 and an upper horizontal part 11 substantially parallel to the base 10 which, together with the back plate 12 and side brackets 13 and 14, maintain the operative parts of the apparatus in proper position. As its basic function, the apparatus serves to transfer liquid heated to its boiling point in the vessel 15 from that vessel to a decanter 16 in which it is combined with soluble material contained in a package 17. The entire operation is accomplished automatically upon the energizing of the electrical circuitry which operates the invention, such actuation controlled by a push button command switch 18 located on a front panel 19 of the frame. A chute 20 is utilized to direct the soluble material, such as soluble coffee, from a package 17a disposed at release position into the decanter 16.

A reel, indicated generally by reference numeral 21, is utilized to locate a package 17 at release position. As illustrated in FIGS. 1 to 6 of the drawings, reel 21 is formed from a vertically disposed, generally circular plate 22, which is mounted on a hub 24 for movement therewith. Hub 24 rotates with respect to the shaft 23, such movement being restricted by a collar 25 which is rigidly fixed to the shaft 23 (FIG. 5). Shaft 23 extends from a vertically disposed centerplate 27 toward the front of the apparatus with its axis in a substantially horizontal plane, shaft 23 being retained against centerplate 27 by means of axial bolt 28. Centerplate 27, itself, is maintained in vertical position by means of base 10, upper horizontal part 11, and side brackets 14 of the apparatus frame.

Rotation of the circular plate 22 is accomplished by means of a reel motor, indicated generally by reference numeral 30, which has a driving gear 31 mounted on an impeller shaft 32 extending therefrom. Driving gear 31 engages a chain 33 which cooperates with a sprocket wheel 34, the latter being immovably fixed to the rotary hub 24. Consequently, the reel motor 30, through the chain drive described herein, serves to rotate the hub 24 and its fixed plate 22 about shaft 23.

The structure of the reel 21 is completed by elongated bars 35 which extend toward the front of the apparatus from surface 36 of plate 22 and are rigidly fixed to the plate 22. Bars 35 are substantially hexagonal in cross section. A plurality of knobs or aligned studs 38 extend outwardly from one surface of the bars 35. As illustrated, studs 38 are not only arranged in a row on each bar 35, but are also aligned so that each stud occupies a point on an imaginary circle which can be drawn to include on its circumference one stud on each of the bars 35 of the reel 21. At all times during rotation of the reel 21, the studs 38 project radially from the elongated bars 35. The precise structure of the plate 22 is best seen in FIG. 6. Clearly shown in this figure are a multiplicity of depressions 39 spaced uniformly along the circumference of the plate 22. These depressions serve to effect the sequence of operation of the apparatus and will be described in greater detail hereinafter.

Elongated bars 35 and their associated studs 38 serve to hold a strip of packages 17 on the periphery of the reel 21 and propel those packages around the reel 21 as the plate 22 and bars 35 are rotated. As will be seen in FIG. 1, a container 40 is positioned on frame base 10 at one side of the apparatus. Container 40 holds a supply of packages 17, which are connected to each other at their ends to form a continuous strip of packages each of which contains a sealed quantity of soluble material therein. Along the lines of juncture of adjoining packages 17 are a plurality of aligned apertures 41 which are positioned so that studs 38 pass through the apertures 41 as those apertures contact the bars 35. The strip of packages is flexible at the lines of juncture. With studs 38 in the apertures 41, movement of bars 35 propels the studs 38 in a circular course, and studs 38 force the strip of packages 17 to conform to rotation of the studs. A further container 42 is positioned at that side of the apparatus opposite the container 40. Container 42 is so positioned that severed package remnants 43 carried by studs 38 after each package 17 has been cut at a central location thereof are deposited in the container 42. Package remnants 43 fall from the studs 38 after the reel has been rotated more than 180 degrees from the location of first contact of the strip with the bar 35. Discharge of package remnants 43 is best illustrated in FIGS. 2 to 4.

Discharge of the soluble material within any single package 17 is accomplished by means of a rotary knife blade 45 which is moved in a path which brings it into contact with a central portion of a package 17 positioned at the uppermost limit of rotation of the reel 21. A package in such release position has been identified in FIGS. 1 and 3 by the reference numerals 17a.

The means by which rotary knife blade 45 is actuated to cut a package 17a is illustrated in detail in FIG. 5 and is also shown in FIGS. 1 to 3. Blade 45 is mounted for rotation on an axle 46 which rotates in a transverse bore in the blade support 48. In turn, blade support 48 is pivotable about a rod 60 which extends through blade support 48 and transversely across the apparatus and is held at its ends by the frame of the apparatus. Control of the pivotal movement of the blade support 48 on the rod 60 is accomplished by means of connecting links 50 and 51, which are hingeably connected to each other by a pin 52. Link 51 is pivotably fixed to a boss 53 on blade control housing 54, which is bolted to the forward frame brackets 13. Link 50 is fixed to an output shaft 49 of the blade motor 56, which itself is carried by blade support 48 at a location within the housing 54. By means of one output shaft, blade motor 56 rotates drive gear 57, sprocket chain 58 and sprocket wheel 59 to rotate the knife blade 45 on its axle 46. Blade motor 56 has two output shafts, the second of which is designated by reference numeral 49. Rotation of output shaft 49 moves the connecting links 50 and 51 to cause the knife blade support 48 and the blade 45 carried thereby throughout a cycle of positions in which the support 48 pivots on rod 60 and the blade 45 is thereby moved across the release position of package 17a and then back to its original position. In FIG. 5 the knife blade position designated by reference numeral 45a is one in which the blade cuts across a package 17a at the release position of the package.

From FIG. 5 and the perspective views of the apparatus of the invention, it will be noted that bails 62 are mounted on a collar 63 fixed to the axle 46 for rotation therewith. Consequently, bails 62 are rotated with the knife blade 45. In the position indicated by reference numeral 62a in FIG. 5, the bails, which extend outwardly on either side of the blade 45, contact and beat a package 17a at release position. Such flailing of a package 17a as it is being severed and immediately thereafter causes the entire quantity of soluble material within the package to be discharged therefrom. Package remnants 43, therefore, contain very little if any soluble material.

A chute 20 is located directly beneath a package 17a at release position. Soluble material which is released from that package as the package is cut by means of the knife blade 45 falls by gravity into the chute 20, through which it is directed into a decanter 16 placed immediately beneath the mouth 64 of the chute. In order to assist the soluble material in making the passage down the chute 20, a blower positioned within housing 65 (FIG. 5) is provided. Air from the blower is directed into the upper end 67 of the chute 20 by means of a suitably disposed baffle 66.

Another important part of the apparatus of the present invention is the means by which water or other liquid at its boiling point is delivered to the decanter 16. Inchoately, such means comprise a vessel 15 in which a liquid 69 therein is heated to its boiling point, and a standpipe 70 through which the liquid 69 is transported from the interior of the vessel 15 into the decanter 16. Vessel 15 and those parts which enable it to function effectively are best illustrated in FIG. 7. It will here be seen that the liquid 69 is maintained at the predetermined level at which it is illustrated by means of a liquid level control 71. Such a control is manufactured by Charles F. Warrick Company, Berkley, Michigan, and employs an electrode 72 which extends downwardly and acts to shut off the means which supplies liquid into the interior of the vessel when the liquid contacts the electrode. An electric circuit is grounded when power flows from the electrode through the liquid to the vessel 15, which is itself grounded. In FIG. 7 the level 75 of the liquid is illustrated as barely contacting the electrode 72 of liquid level control 71, so that the means (not shown) which supplies liquid under pressure through intake pipe 73 into the vessel 15 is de-energized. Valve means in the intake pipe 73 functions to prevent liquid 69 from flowing from the vessel 15 through the pipe 73 after liquid is no longer supplied to the vessel.

The level of liquid 69 shown in FIG. 7 is designed by reference numeral 75. A lower liquid level is illustrated by broken line 76. Such lower level is approximately that level which the liquid will assume when the liquid 69 has been heated to its boiling point and a maximum quantity thereof has flowed from the vessel 15 through the standpipe 70 into the decanter 16. Heating of the liquid 69 is accomplished by means of an external heating unit 77 located at the bottom 79 of the vessel 15 and internal heating coils 78 which extend within the vessel 15 below the lower level 76 of liquid 69. It will thus be seen that heating coils 78 will always be immersed in the liquid 69. In the illustrated embodiment of the invention, heating unit 77 is of lesser heating capacity than the coils 78 and is used to maintain the liquid in the vessel 15 at a temperature of 150–160° F. Heating coils 78 are energized only when it is desired to heat liquid 69 to its boiling point.

The basic method used to force liquid 69 through the standpipe 70 into the decanter 16 is as follows. Liquid 69 is heated to its boiling point, at which temperature the vapor pressure in the space 80 between the liquid level 75 and the upper wall 81 of the vessel 15 increases to force liquid into the end 82 of the standpipe or conduit 70. End 82 extends downwardly within vessel 15 on a substantially vertical line. This high vapor pressure continues to be maintained within the vessel 15 until the liquid 69 reaches a level approximately that indicated by broken line 76. When all the liquid at that level has been forced into open end 82 of standpipe 70 and through the standpipe 70 into the decanter 16, and the level of liquid 69 is substantially at the open end 82, vapor will be forced into that open end. This vapor will be steam if the liquid 69 is water. The discharge of the vapor drastically reduces the vapor pressure within the vessel 15 and all discharge through standpipe 70 ceases.

An important feature of this invention is directed to a device which prevents the discharge of small amounts of liquid 69 through the standpipe 70 before the liquid has reached its boiling point. Such discharge is undesirable, since that liquid is not at its boiling point and also because small amounts of liquid in contact with the soluble material from packages 17 tend to clump and ball that material. When the main body of liquid 69 at its boiling point is later discharged into the decanter 16, such clumps may not dissolve in the boiling liquid and will thus materially lower the quality of the beverage produced. In order to prevent premature liquid discharge or "dribbling", vent means are provided in the upper wall 81 of the vessel 15. The vent means includes T-shaped conduit 83 one end of which connects with upper vessel wall 81 and forms an aperture 84 therewith. By means of a flexible hose 85 the space 80 in vessel 15 is connected through conduit 83 with a diaphragm pressure switch 86 adjusted to change position when the vapor pressure in space 80 is just below the vapor pressure of the liquid at its boiling point. Also connected to the conduit 83 by means of flexible hose 88 is a vent valve 89 which is movable between one position in which it permits a small amount of vapor coming to it by means of hose 88 to pass into standpipe 70 through connecting tube 90, and another position in which it obstructs all flow of vapor in the hose 88 past valve 89. Release of a small amount of vapor by the vent valve 89 into the standpipe 70 has been found to prevent dribbling. However, when liquid 69 approaches its boiling point, the vapor pressure within vessel 15 increases to a pressure which actuates diaphragm pressure switch 86, which then acts to close vent valve 89. With vent valve 89 in closed position, the liquid 69 quickly reaches its boiling point.

Another feature which has been found highly advantageous in use in the present apparatus is a cup 92, best illustrated in FIGS. 7 and 8. Cup 92 is formed with a continuous bottom 93 and a side wall 94 extending upwardly from bottom 93 and sealed thereto to prevent the passage of liquid between the bottom and side walls. Side wall 94 has apertures 95 provided therein at locations substantially above the bottom 93 of the cup 92. As illustrated in FIG. 8, the apertures 95 are of such dimensions that side wall 94 is in the shape of elongated struts 96 in that area where the side wall 94 is cut by apertures 95. Above the apertures 95 side wall 94 is in the form of an annulus 97 joined to side wall 94 by means of the struts 96.

The diameter of annulus 97 is slightly larger than the diameter of the standpipe 70, so that cup 92 can be clamped to the standpipe 70 over its lower end 82 by means of a set screw 99 located in a threaded aperture 98 in the annulus 97. The manner in which cup 92 is clamped to standpipe 70 is best seen in FIG. 7. It will there be seen that, when the cup 92 is in clamped position, annulus or collar 97 closely engages the side wall of the standpipe 70 at a location such that conduit end 82 extends within the cup 92 to a position just below the apertures 95. At the location of conduit end 82 side wall 94 is continuous and the diameter of the cup 92 is substantially larger than the diameter of conduit end 82. Mounted in such position, cup 92 provides a liquid level within the cup indicated by broken line 100. This liquid level is somewhat below liquid level 76, and is only maintained when liquid outside the cup has been lowered to the level indicated by broken line 76 and the vapor pressure with the vessel 15 still forces liquid 69 through the standpipe 70. The last liquid to be forced into the open end 82 of conduit 70, therefore, will be that liquid within the cup 92 between liquid levels 76 and 100. When a meniscus is created as the last of this liquid enters conduit end 82, that meniscus will only extend from the wall of the standpipe 70 to side wall 94 of cup 92. Quite large variations in the shape of this meniscus will thus result in but minor differences in the volume of water entering standpipe 70. On the other hand, were no cup 92 provided in the position illustrated in FIG. 7, the meniscus would be a broad one extending from the wall of standpipe 70 to the side wall of the vessel 15. Meniscus variations in the latter case could result in wide fluctuations in the amount of liquid entering the standpipe 70.

Referring now to FIGS. 1 to 3 of the drawings, a bracket 101 is used to hold a decanter 16 supported in receiving position on the rest 102 so that the decanter cannot be moved from that position during the cycle of operation of the apparatus. Side members 103 of bracket 101 together with handle 104 and frame front plate 105 bound the decanter 16 when the latter is in receiving position. Bracket 101 is movable from bounding position by pivoting on pins 106 fixed to the ends of side members 103 and rotating in apertures in opposed frame brackets 13, such movement being accomplished by springs 112 fastened to brackets 13 and side members 103 at each side of the bracket 101.

Other parts of the present apparatus which are illustrated in FIG. 1 are a reel microswitch 107 which is fixed to the frame of the apparatus and has a flexible arm 108 which extends outwardly from the microswitch and terminates in a feeler member 109. Flexible arm 108 continuously urges feeler member 109 against the circumference of plate 22 so that, when a depression 39 on the circumference of plate 22 of reel 21 is reached, feeler member 109 is forced into the depression. This action effects a change of position of feeler arm 108 and a consequent change of position of microswitch 107.

Also illustrated in FIG. 1 is means sensing the presence or absence of a package 17 as the packages approach release position. Such means includes a flexible feeler arm 110 connected to a microswitch 111 which changes position when feeler arm 110 moves to indicate the absence of a package 17 in position to be moved to material release position by the reel 21. Further illustrated in FIG. 1 is a blade guide 114 provided with a slot 115 through which knifeblade 45 passes in correct package-cutting position.

Shown in FIG. 2 is knife microswitch 117. This microswitch is provided with a depressible arm 118, which is depressed by contact arm 119 which moves with the blade support 48 as the latter is actuated by the blade motor 56. After the knife blade 45 has been moved through one cutting cycle, contact arm 119 depresses feeler arm 118 to open microswitch 117 and shut off blade motor 56.

The manner in which the vessel 15 is supported on the frame of the apparatus is best illustrated in FIGS. 3 and 4. A flange 120 is formed in the circumference of an upper portion of the side wall of the heating vessel. Bolts 121 extend through apertures in flange 120 and through aligned apertures in brackets 122. Since brackets 122 are fixed to frame brackets 14, the vessel 15 is thereby supported by the frame of the apparatus.

Also seen in FIGS. 3 and 4 is a thermostat 123 fixed in the side wall of vessel 15 and functioning to maintain the temperature therein at 150–160° F. during periods when the apparatus is "on" but not producing a beverage.

OPERATION

The apparatus which has been illustrated in the drawings and described hereinbefore is operated as follows:

A strip of packages 17 folded along the juncture lines between adjoining packages is inserted in the container 40, and the last package of the strip is raised and draped over two bars 35 of the reel 21 so that the rows of apertures 40 of the strip fits over aligned rows of studs 38 on two adjacent bars 35 of the reel 21. In this hand-mounted location the end package occupies a position across adjacent bars 35 such that, during one continuous operation of reel motor 30, that end package will be moved to release position at the top of the reel. In this position other packages 17 of the strip will be located out of the container 40, but the main body of packages 17 of the strip will be arranged in face-to-face relationship in the container.

Command switch 18 is now moved to "on" position. This brings a supply of electricity to the apparatus and the means for supplying liquid 69 through supply line 73 to the interior of the vessel 15 is energized, whereupon liquid 69 is forced into the vessel 15 under pressure to the level of line 75, entry of a larger quantity of liquid being prevented by liquid level control 71. Also actuated is the external heating unit 77, which commences to heat liquid 69 to 150–160° F. The apparatus is now ready to provide a decanter of coffee or like beverage, or hot water, if such is desired.

A decanter 16 is now placed on the rest 102 and bracket 101 depressed so that the decanter 16 is held in place. Bracket 101 locks in place and cannot be removed until a cycle of operation has been completed. Another switch 113 located on the panel 19 is now moved to "on" position. In this position the cycle of operations is begun. A flow of electricity is supplied to heater coils 78 and liquid 69 is rapidly heated toward its boiling point. Simultaneously with the flow of current to heater coils 78 reels motor 30 is energized and reel 21 is rotated until feeler member 109 drops into depression 39 in the circumference of reel plate 22. Movement of member 109 and feeler arm 108 moves microswitch 107 to "off" position and stops reel motor 30. With reel motor 30 out of the circuit, knife blade motor 56 is energized and knife blade 45 begins to rotate. Knife blade support 48 is simultaneously moved by blade motor 56 and intermediate links 50 and 51 toward a package 17a containing soluble material. Package 17a has been moved to release position by rotation of the reel 21.

When rotating knife blade 45 reaches the release position occupied by package 17a, it cuts the package at a central portion thereof, the soluble material within the package is released, and bails 62 rotating with and at either side of knife blade 45 flail the package 17a to ensure complete release of the soluble material. The soluble material falls into the chute 20 and, aided by a flow of air the blower powered by motor 65, drops into the decanter 16.

Shortly after a predetermined supply of soluble material has been deposited in decanter 16, the liquid 69 in vessel 16 has approached its boiling point and vent valve 89 is closed by diaphragm pressure switch 86. Closure of vent valve 89 quickly brings liquid 69 to its boiling point and vapor pressure within the vessel 15 forces the liquid from the level 75 downwardly and up into conduit end 82 and through the standpipe 70 into decanter 16 until the liquid reaches a level 76 outside the cup 92. Within the cup 92 the liquid is brought to a level 100 and forms a short meniscus with the side wall of standpipe 70.

As vapor within vessel 15 enters the end 82 of conduit 70, vapor pressure in the vessel drops. This drop moves diaphragm pressure switch 86 to open vent valve 89, de-energizes heating coil 78, and actuates the means supplying liquid to the vessel 15 through line 73. Liquid 69 is again supplied to the vessel 15 until electrode 72 of liquid level control 71 is contacted by the liquid at the level 75. At this point the means locking bracket 101 in place is released and that bracket can be lifted by handle 104 and the decanter, which now contains an agitated solution of liquid 69 and soluble material from the package 17, can be removed from its position on rest 102.

WIRING DIAGRAM

A wiring diagram which illustrates electrical circuitry suitable for use in the operation of the apparatus described hereinbefore and illustrated in the drawings is shown in FIG. 9. It will there be seen that movement of On-Off switch 18 to "on" position links parts of an outer circuit 125 which has been designated as being a 208 volt line. Outer circuit 125, however, remains open until switches PR-1 and PR-2, actuated by the power relay, are closed.

Movement of On-Off switch 18 to "on" position also links parts of, and closes, an inner circuit 126, which is designated as a 115 volt line. When inner circuit 126 is closed, those parts of the present apparatus which are immediately actuated are blower motor 65, ready indicator 153, and external heating unit 77. Heating unit 77 will at that time be energized only if the thermostat 123 in the line of that unit is in "closed" position. As indicated in FIG. 9, thermostat 127 acts to maintain the temperature of the liquid in vessel 15 at 150° to 160° F. Thus, with the On-Off switch in "on" position, heater 77 will be energized when the temperature of the liquid in the vessel 15 falls below 150° F., and will be de-energized when that liquid temperature exceeds 160° F.

The beverage apparatus according to the present invention is now in position to begin a brewing cycle, which is initiated by the closing of start switch 113. Depression of start switch 113 closes a circuit including timer motor 129, and thereby energizes the timer motor 129 which turns and closes the contacts on the motor timer 132. Motor timer 132 locks in the timer motor 129 so that subsequent release of start switch 113 will not throw out timer motor 129.

However, the power flow to timer motor 129 on depression of start switch 113 will be initiated only if no bag switch 111 is in position to link the line through the start switch 113 with the remainder of the circuit. No bag switch 111 is controlled by feeler arm 110, which senses the presence or absence of a bag or package 17 from proper position on the reel 21. When feeler arm 110 does not sense a package, no bag switch 111 is moved to the position illustrated in FIG. 9 in which it closes a circuit including no bag indicator 131 and opens the line including start switch 113. Subsequent furnishing of a package 17 moves no bag switch 111 to its other position and permits the start of a brewing cycle.

With a package 17 in proper position on the reel 21, and start switch depressed, the contacts of relay timer 141 close and locking relay 142 is energized. The effect of energizing locking relay 142 will be related in detail later. A fixed period of time after relay timer 141 is closed, the contacts of reel timer 130 close and feed an impulse to reel motor 30, which turns and overrides reel limit switch 107, moving the latter to closed position. Reel motor 30 rotates reel 21 until the reel reaches an indexing position at a depression 39 on the periphery of the reel 21. Depression 39 permits reel limit switch to reassume its normally open position and throw out reel motor 30. A predetermined period of time after reel limit switch opens, the contacts of knife timer 136 are closed as the knife timer is rotated by timer motor 129. Knife timer 136 feeds an impulse to knife motor 56, which rotates and overrides normally open knife limit switch 117 and moves the latter to closed position. With knife motor 56 energized, knife blade assembly 48 moves in a downward sweep and returns it to its initial position, when knife limit switch 117 is returned to its normally open position to throw out knife motor 56. Motor timer 132 now shuts itself off and start switch 113 must again be depressed before another cycle of operation can be begun.

It will be noted that included in the circuit of the timer motor 129, reel motor 30 and knife motor 56, is a selector switch 140. As indicated, this switch can be manually moved between positions in which the beverage apparatus will produce hot water only and in which the beverage apparatus will produce a coffee brew. The circuit which, upon actuation, rotates reel 21 and knife assembly 48, is only actuated when selector switch 140 is in "coffee" position. That switch is illustrated in "hot water" position in FIG. 9, and it is apparent that when selector switch 140 is in that position, reel motor 30 and knife motor 56 will not be actuated upon depression of start switch 113.

As stated hereinbefore, actuation of timer motor 129 closes relay timer 141 almost immediately after the motor timer 132 has been energized. Closing of relay timer 141 sends power to a locking relay 142, which locks itself in regardless of further movement of the cam of relay timer 141. With locking relay 142 locked in, the three switches 143, 144, and 145, which are part of locking relay 142, are moved from their illustrated, normally open position to closed position. Such movement has the following effect. Movement of switch 143 closes a circuit including brewing indicator 147, which lights to show that a brewing cycle has begun. Closing of switch 143 does not close vent valve 89, which remains in open position, to permit air to escape from vessel 15 as additional liquid enters the vessel.

Closing of switch 144 of locking relay 142 permits power to flow through the relay timer and switch 144 into the liquid level sensing device 71, which, in the particular Warrick liquid level control used, has two control switches. One of the control switches 147 is normally open while the other, 148, is normally closed. Liquid level control switch 147 is in open position when the vessel 15 is being filled with water. After the vessel is filled to the proper level, this switch is in closed position. Liquid level control switch 148 is in normally closed position and actuates water level valve 150, which permits a flow of water through conduit 73 into the vessel 15. As indicated by broken line 151, the switches 147 and 148 of the liquid level control act together so that water fill valve 150 is only actuated when switch 148 is closed and switch 147 is open. When the liquid level electrode 72 is contacted by water in the vessel 15, power in the line leading to the electrode is grounded through the water and the vessel 15 to cause a flow of current through the transformer 152 of the liquid level control, which flow opens switch 148 and thereby closes fill valve 150. At this point no further water flows into the vessel 15, which is filled to the liquid level indicated by reference numeral 75 and illustrated in FIG. 7 of the drawings.

Simultaneously with the closing of normally open switches 143 and 144 by means of locking relay 142, relay switch 145 is moved from a normally open to closed position. Such movement throws out ready indicator 153 which is normally lit and indicates that a brewing cycle can be started. When the ready indicator 153 goes out, brewing indicator 147 is simultaneously actuated to indicate that a brewing cycle is presently underway. Closing of switch 145 also energizes power relay 154, which closes swicthes PR–1 and PR–2 in the outside line 125, which includes heating coils 78. As indicated by broken lines 155, switches PR–1 and PR–2 are movable together. With switches PR–1 and PR–2 closed, heater coil 78 energizes and rapidly supplies heat to the liquid in the vessel 15 and external heater 77 is energized regardless of the position of the thermostat 123.

Prior to the initiation of a brewing cycle upon closure of the switches of locking relay 142, pressure switch 86, illustrated in FIGS. 3 and 7 as a diaphragm pressure switch, remains in its normally closed position. In that position it closes a circuit including water fill valve 150, and liquid flows into vessel 15 until liquid level control switch 148 opens when electrode 72 is grounded. When the pressure in head space 80 within vessel 15 increases as the liquid approaches its boiling point, pressure switch 86 is moved to open position just as the liquid reaches its boiling point. This movement of pressure switch 86 closes vent valve 89 and throws out the locking relay 142 thereby open locking relay switches 143, 144, and 145. With locking relay open, power relay 154 is de-energized, which opens switches PR–1 and PR–2 and throws outer circuit 125 to de-energize heating coils 78. When the liquid in the vessel 15 reaches the lower extremity of the standpipe 70, the pressure within the vessel 15 decreases, so that pressure switch 86 returns to its normally closed position. However, locking relay 142 remains open until it is re-energized at the start of another brewing cycle. With the switches of the locking relay in open position, ready indicator 153 is energized and brewing indicator 147 is de-energized. Water fill valve 150 is closed and remains closed until opened by liquid level control switch 148. Still energized are blower motor 65 and external heater 77, the latter, however, now only being energized when thermostat 123 indicates that the temperature of the liquid in the vessel 15 is below 150° F. The apparatus is now in condition to start another brewing cycle on depression of start switch 113.

Advantageously, the apparatus of the present invention can be operated so that, in the alternative, a supply of hot beverage may be produced in accordance with the method of operation described hereinbefore or a decanter of hot water may be obtained. When hot water is desired for use in making tea, hot chocolate, or the like, a control is moved so that reel motor 30 and knife blade motor 56 are not actuated. With these two motors out of the circuit, water can be heated in vessel 15 and transported to the decanter 16 through standpipe 70 without any soluble material having previously been deposited in the decanter. Also variable are the strength and quantity of the beverage solution which can be obtained through operation of the present apparatus. Liquid level control 71 can be adjusted so that electrode 72 is moved vertically within the vessel 15. It will, of course, be apparent that the higher the position of the electrode 72, the more liquid 69 will be retained within the vessel and the greater will be the amount of that liquid discharged through the standpipe 70 in any one cycle of operation.

While the present invention has been described and illustrated with reference to a single specific embodiment thereof, it will be understood that the invention is not to be limited to the structure of that embodiment, it being desired that the present invention be limited only by the scope of the following appended claims.

What is claimed is:

1. Apparatus for conveying a liquid at its boiling point, comprising a vessel for holding liquid therein, means for supplying liquid to said vessel, means for limiting the amount of liquid in said vessel to a predetermined level, a conduit extending from a location outside said vessel to a position within said vessel in which an end of said conduit is below said level means for heating said liquid, a vent in said vessel at a location above said level for releasing a predetermined amount of vapor before said liquid is brought to its boiling point, and means for automatically closing said vent when the liquid in said vessel has been heated to its boiling point.

2. Apparatus for conveying a liquid at its boiling point, comprising a vessel for holding liquid therein, means for supplying liquid to said vessel, means for limiting the amount of liquid in said vessel to a predetermined level, a conduit extending from a location outside said vessel to a position within said vessel in which an end of said conduit is below said level means for heating said liquid to its boiling point to force a quantity of said liquid through said conduit end and from said vessel until the level of said liquid falls below said conduit end, whereby the vapor pressure in said vessel decreases, and means responsive to a decrease in said vapor pressure to actuate said liquid supplying means to refill said vessel with liquid to said level.

3. Apparatus for conveying a liquid at its boiling point, comprising a vessel for holding liquid therein, means for supplying liquid to said vessel, means for limiting the amount of liquid in said vessel to a predetermined level, a conduit extending from a location outside said vessel to a position within said vessel in which an end of said conduit is below said level, means for heating said liquid to its boiling point to force a quantity of said liquid through said conduit end and from said vessel until the level of said liquid falls below said conduit end, whereby the vapor pressure in said vessel decreases, means responsive to a decrease in said vapor pressure to actuate said liquid supplying means to refill said vessel with liquid to said level, a vent in said vessel at a location above said level, and means for closing said vent when the liquid in said vessel has been heated to its boiling point.

4. A device for preventing the formation of a broad meniscus between a liquid and the end of a conduit, said end extending substantially vertically into the liquid, comprising a cup having an inside diameter larger than the outside diameter of said conduit end, said cup having a continuous bottom and a side wall extending upwardly therefrom, said side wall having at least one aperture therein at a location substantially above said bottom, and means for attaching said cup to said conduit so that said conduit end projects within said cup at least to the lowest level of said aperture.

5. Apparatus for conveying a liquid at its boiling point, comprising a vessel for holding liquid therein, means for supplying liquid to said vessel, means for limiting the amount of liquid in said vessel to a predetermined level, a conduit extending from a location outside said vessel to a position within said vessel in which an end of said conduit is below said level, means for heating said liquid, a vent in said vessel at a location above said level, and diaphragm-actuated switch means responsive to the vapor pressure in said vessel for closing said vent when the liquid in said vessel has been heated to its boiling point.

References Cited by the Examiner

UNITED STATES PATENTS

| | | | |
|---|---|---|---|
| 2,079,898 | 5/1937 | Burchenal | 222—146 |
| 2,539,349 | 1/1951 | Giles | 222—464 X |

FOREIGN PATENTS

| | | |
|---|---|---|
| 12,301 | 8/1910 | France. |
| 120,441 | 12/1947 | Sweden. |

ROBERT B. REEVES, *Primary Examiner.*

HADD S. LANE, *Examiner.*